United States Patent
Lu et al.

(10) Patent No.: US 10,199,036 B2
(45) Date of Patent: Feb. 5, 2019

(54) METHOD AND DEVICE FOR IMPLEMENTING VOICE INPUT

(71) Applicant: Baidu Online Network Technology (Beijing) Co., LTD., Beijing (CN)

(72) Inventors: Yangyang Lu, Shanghai (CN); Lei Jia, Beijing (CN)

(73) Assignee: Baidu Online Network Technology (Beijing) Co., LTD., Beijing (CN)

( * ) Notice: Subject to any disclaimer, the term of this patent is extended or adjusted under 35 U.S.C. 154(b) by 0 days.

(21) Appl. No.: 14/412,374

(22) PCT Filed: Dec. 17, 2013

(86) PCT No.: PCT/CN2013/089721
§ 371 (c)(1),
(2) Date: Dec. 31, 2014

(87) PCT Pub. No.: WO2014/101687
PCT Pub. Date: Jul. 3, 2014

(65) Prior Publication Data
US 2015/0302852 A1    Oct. 22, 2015

(30) Foreign Application Priority Data
Dec. 31, 2012 (CN) .......................... 2012 1 0592826

(51) Int. Cl.
G10L 15/08 (2006.01)
G10L 15/30 (2013.01)
(Continued)

(52) U.S. Cl.
CPC .............. G10L 15/08 (2013.01); G06F 3/167 (2013.01); G10L 15/22 (2013.01); G10L 15/30 (2013.01);
(Continued)

(58) Field of Classification Search
CPC ...................................................... G10L 15/30
See application file for complete search history.

(56) References Cited

U.S. PATENT DOCUMENTS 5,033,087 A * 7/1991 Bahl ....................... G10L 15/14
704/245
5,058,167 A * 10/1991 Kimura ................... G10L 15/00
704/249
(Continued)

FOREIGN PATENT DOCUMENTS

CN        1197962       11/1998
CN      101276585       10/2008
(Continued)

OTHER PUBLICATIONS

Bahl, Lalit R., Frederick Jelinek, and Robert L. Mercer. "A maximum likelihood approach to continuous speech recognition." IEEE transactions on pattern analysis and machine intelligence 2 (1983): 179-190.*

(Continued)

*Primary Examiner* — Brian L Albertalli
(74) *Attorney, Agent, or Firm* — Nixon Peabody LLP

(57) ABSTRACT

A network device for implementing voice input comprises an input-obtaining module for obtaining voice input information, a sequence-determining module for determining an input character sequence corresponding to the voice input information based on a voice recognition model, an accuracy-determining module for determining appearance-probability information corresponding to word segments in the input character sequence so as to obtain accuracy information of the word segments, and a transmitting module for transmitting, to a user device, the input character sequence and the accuracy information of the word segments corresponding to the voice input information.

8 Claims, 4 Drawing Sheets

(51) Int. Cl.
*G06F 3/16* (2006.01)
*G10L 15/22* (2006.01)
*G10L 15/26* (2006.01)
*G10L 15/04* (2013.01)

(52) U.S. Cl.
CPC .............. *G10L 15/04* (2013.01); *G10L 15/26* (2013.01); *G10L 2015/221* (2013.01); *G10L 2015/228* (2013.01)

(56) References Cited

U.S. PATENT DOCUMENTS

| | | | | |
|---|---|---|---|---|
| 5,233,681 | A * | 8/1993 | Bahl | G10L 15/19 704/251 |
| 5,267,345 | A * | 11/1993 | Brown | G10L 15/197 704/255 |
| 5,467,425 | A * | 11/1995 | Lau | G10L 15/197 704/240 |
| 5,638,425 | A * | 6/1997 | Meador, III | G10L 15/30 379/218.01 |
| 5,652,898 | A * | 7/1997 | Kaji | G06F 17/2735 704/10 |
| 6,269,335 | B1 * | 7/2001 | Ittycheriah | G10L 15/22 704/239 |
| 6,356,866 | B1 * | 3/2002 | Pratley | G06F 17/2863 704/9 |
| 6,526,380 | B1 * | 2/2003 | Thelen | G10L 15/32 704/251 |
| 7,996,218 | B2 | 8/2011 | Kim et al. | |
| 8,005,673 | B2 * | 8/2011 | Nagashima | G10L 15/20 704/231 |
| 8,346,563 | B1 * | 1/2013 | Hjelm | G10L 15/1822 379/88.01 |
| 9,318,111 | B2 * | 4/2016 | Lee | G10L 15/22 |
| 2002/0184019 | A1 | 12/2002 | Hartley et al. | |
| 2003/0078777 | A1 * | 4/2003 | Shiau | G10L 15/30 704/251 |
| 2005/0010422 | A1 * | 1/2005 | Ikeda | G10L 15/30 704/277 |
| 2005/0131686 | A1 * | 6/2005 | Yamamoto | G10L 15/197 704/231 |
| 2005/0143998 | A1 * | 6/2005 | Ogawa | G10L 15/06 704/251 |
| 2006/0015336 | A1 | 1/2006 | Parthasarathy | |
| 2008/0130699 | A1 | 6/2008 | Ma et al. | |
| 2008/0221890 | A1 * | 9/2008 | Kurata | G10L 15/063 704/251 |
| 2008/0221896 | A1 * | 9/2008 | Cai | G10L 15/19 704/270.1 |
| 2008/0270118 | A1 * | 10/2008 | Kuo | G06F 17/273 704/9 |
| 2009/0157404 | A1 * | 6/2009 | Brown | G10L 15/19 704/257 |
| 2009/0187410 | A1 * | 7/2009 | Wilpon | G10L 15/30 704/270.1 |
| 2009/0228273 | A1 | 9/2009 | Wang et al. | |
| 2009/0234647 | A1 * | 9/2009 | Scholz | G10L 15/30 704/235 |
| 2010/0042414 | A1 * | 2/2010 | Lewis | G10L 15/08 704/270.1 |
| 2011/0166851 | A1 * | 7/2011 | LeBeau | G06F 17/273 704/9 |
| 2011/0224983 | A1 * | 9/2011 | Moore | G06F 17/2715 704/240 |
| 2012/0035924 | A1 * | 2/2012 | Jitkoff | G01C 21/3608 704/235 |
| 2012/0290303 | A1 | 11/2012 | Lee et al. | |
| 2013/0041647 | A1 * | 2/2013 | Ramerth | G06F 17/2863 704/2 |
| 2013/0151250 | A1 * | 6/2013 | VanBlon | G10L 15/30 704/235 |
| 2013/0268269 | A1 * | 10/2013 | Schalk | G01C 21/26 704/231 |
| 2013/0289988 | A1 * | 10/2013 | Fry | G10L 15/19 704/239 |

FOREIGN PATENT DOCUMENTS

| | | | |
|---|---|---|---|
| CN | 101309327 | 11/2008 | |
| CN | 102063195 | 5/2011 | |
| CN | 102299934 | 12/2011 | |
| CN | 102385619 | 3/2012 | |
| CN | 103076893 | 5/2013 | |
| EP | 1189203 A2 * | 3/2002 | ............ G10L 15/22 |
| EP | 1975923 | 10/2008 | |
| JP | 1982195300 A | 11/1982 | |
| JP | 2010055044 A | 3/2010 | |
| JP | 2012252026 A | 12/2012 | |

OTHER PUBLICATIONS

Supplement European Search Report for EP13869832 dated Jun. 23, 2016, 2 pages.
Notification of Reasons for Refusal (Translated) for JP2015549964 dated Feb. 7, 2017, 5 pages.

* cited by examiner

METHOD AND DEVICE FOR IMPLEMENTING VOICE INPUT

CROSS REFERENCE TO RELATED APPLICATIONS

This application is the U.S. national stage under 35 USC 371 of international application PCT/CN2013/089721, filed on Dec. 17, 2013, which claims the benefit of the Dec. 31, 2012 priority date of Chinese application 201210592826.2. The contents of all the foregoing are herein incorporated by reference.

FIELD OF THE INVENTION

The present invention relates to the field of Internet, and in particular to the technology for implementing voice input.

BACKGROUND OF THE INVENTION

With the development of voice recognition technology, voice input is applied to more and more fields. In many cases, however, voice input still causes a lot of errors, for example, an inaccuracy of recognizing and defining homophones and so on, which results in a lower accuracy of voice input and affects user experience.

SUMMARY OF THE INVENTION

An object of the invention is providing a method and a device for implementing voice input.

According to one aspect of the invention, a method for implementing voice input in a network device is provided, wherein the method comprises the following steps:

a. obtaining the voice input information;

b. determining an input character sequence corresponding to the voice input information based on a voice recognition model;

c. determining appearance probability information corresponding to word segments in the input character sequence so as to obtain accuracy information of the word segments;

d. transmitting the input character sequence and the accuracy information of the word segments to a user device corresponding to the voice input information.

According to another aspect of the invention, a method for implementing voice input subsidiarily in a user device is further provided, wherein the method comprises the following steps:

A. obtaining an input character sequence corresponding to voice input information transmitted by a network device and accuracy information of word segments in the input character sequence;

B. providing the input character sequence to a user based on accuracy information of the word segments.

According to another aspect of the invention, a network device for implementing voice input is further provided, wherein the device comprises:

an input obtaining module for obtaining the voice input information;

a sequence determining module for determining an input character sequence corresponding to the voice input information based on a voice recognition model;

an accuracy determining module for determining appearance probability information corresponding to word segments in the input character sequence so as to obtain accuracy information of the word segments;

a transmitting module for transmitting the input character sequence and the accuracy information of the word segments to a user device corresponding to the voice input information.

According to another aspect of the invention, a user device for implementing voice input subsidiarily is further provided, wherein the device comprises:

a sequence obtaining module for obtaining an input character sequence corresponding to voice input information transmitted by a network device and accuracy information of word segments in the input character sequence;

a providing module for providing the input character sequence to a user based on accuracy information of the word segments.

According to another aspect of the invention, a system for implementing voice input is further provided, comprising the network device as foresaid and the user device as foresaid.

Compared with prior art, the present invention obtains the accuracy information of word segments by means of determining an input character sequence corresponding to voice input information based on voice recognition models at the network device and determining the appearance probability information corresponding to the word segments in the input character sequence, and thereby transmits the input character sequence and the accuracy information of the word segments to a user device corresponding to the voice input information; the user device provides the input character sequence to the user based on the accuracy information of the word segments, and thereby obtains the accuracy information of the word segments based on the appearance probability information of the word segments in the input character sequence. This improves the accuracy and flexibility of voice input, causes the input word entries to match with the users' input requirements, improves input flexibility and individuation, increases an input efficiency of input method and improves user experience.

Moreover, the present invention could obtains, at the network device, an access request for alternative items of at least one of the word segments transmitted by the user device, determines one or more alternative items corresponding to at least one of the word segments based on the access request, and then, transmits the one or more alternative items to the user device; and provides, at the user device, at least one of the one or more alternative items to the user. Furthermore, at the network device, it can determine, in conjunction with context information of at least one of the word segments, one or more alternative items corresponding to at least one of the word segments; furthermore, at the user device, it can replace the corresponding word segments in the input character sequence based on the user's select operation on at least one of the one or more alternative items so as to obtain the updated input character sequence. Thereby, it provides the users with various alternatives for modifying errors during voice input, improves the accuracy and flexibility of voice input, causes the input word entries to match with the users' input requirements, improves input flexibility and individuation, increases an input efficiency of input method and improves user experience.

Moreover, the present invention could determine, at the network device, a conditional probability of the word segments in the input character sequence as appearance probability information of the word segments, and determine accuracy information of the word segments based on the conditional probability; furthermore, it can determine the appearance probability threshold value based on the appearance probability information of the word segments and the appearance probability information of candidate word segment(s) corresponding to the word segments. Thereby, it improves accuracy and flexibility of voice input by combining the whole character sequence, causes the input word entries to match with the users' input requirements, improves input flexibility and individuation, increases an input efficiency of input method and improves user experience.

Moreover, the present invention could determine, at the network device, an input character sequence corresponding to the voice input information based on a voice recognition model in conjunction with context information corresponding to the voice input information. Thereby, it improves an accuracy of the determined input character sequence by combining the context information, and then, improves the accuracy and flexibility of voice input, causes the input word entries to match with the users' input requirements, improves input flexibility and individuation, increases an input efficiency of input method and improves user experience.

BRIEF DESCRIPTION OF THE DRAWINGS

Other features, purposes and advantages of the invention will become more explicit by means of reading the detailed statement of the non-restrictive embodiments made with reference to the accompanying drawings.

Figure 1:
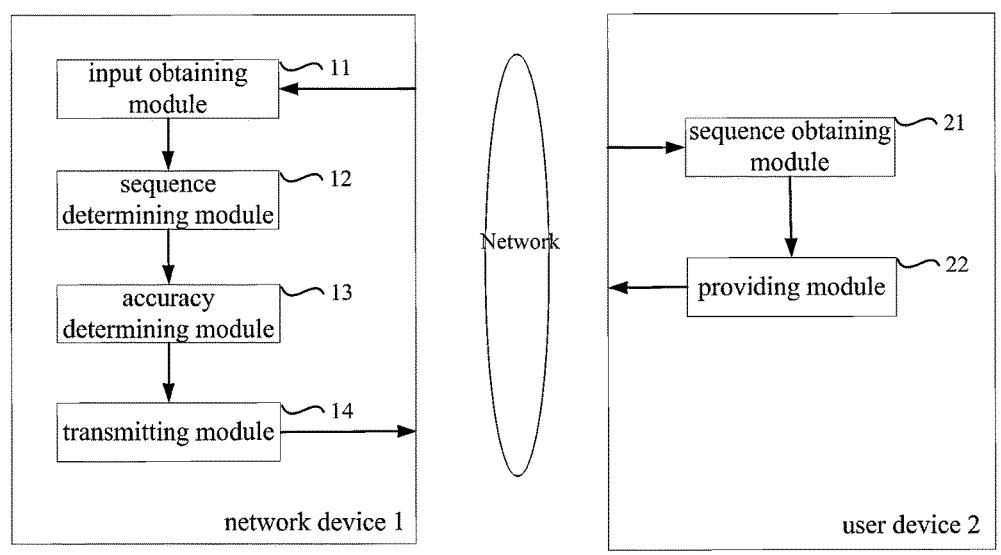
FIG. 1 shows a schematic diagram of the network device and the user device for implementing voice input according to one aspect of the present invention.

The same or similar reference signs in the drawings represent the same or similar component parts.

DETAILED DESCRIPTION OF THE INVENTION

Below, details of the invention will be further provided in combination with the accompanying drawings.

FIG. 1 shows a schematic diagram of the network device and the user device for implementing voice input according to one aspect of the present invention; wherein, the network device 1 comprises an input obtaining module 11, a sequence determining module 12, an accuracy determining module 13, a transmitting module 14; the user device 2 comprises a sequence obtaining module 21, a providing module 22; the modules of the network device 1 and the user device 2 work in coordination for implementing voice input. Specifically, the input obtaining module 11 of the network device 1 obtains the voice input information; the sequence determining module 12 determines an input character sequence corresponding to the voice input information based on a voice recognition model; the accuracy determining module 13 determines appearance probability information corresponding to word segments in the input character sequence so as to obtain accuracy information of the word segments; the transmitting module 14 transmits the input character sequence and the accuracy information of the word segments to a user device corresponding to the voice input information; accordingly, the sequence obtaining module 21 obtains an input character sequence corresponding to voice input information transmitted by a network device and accuracy information of word segments in the input character sequence; the providing module 22 provides the input character sequence to a user based on accuracy information of the word segments.

The network device includes, but not limited to, personal computer(s), network host(s), single network server, a set of multiple network servers or a cloud network formed by multiple servers; herein, the cloud network is formed by a large number of computers or network servers based on Cloud Computing, wherein, the cloud computing is a kind of distributed computing, which is a virtual supercomputer consisting of a group of loosely coupled computers set. The user device includes, but not limited to, any electronic product could process man-machine interaction with the user through keyboard, remote-control unit, touch panel, or acoustic equipment, such as personal computers, smart phones, PDAs, game consoles, or IPTV and so on. The network includes, but not limited to, the Internet, Wide Area Network, Metropolitan Area Network, LAN, VPN, wireless self-organizing network (Ad Hoc network), etc. Those skilled in the art should understand that other network device or user device which could implement voice input, if applicable to the present invention, should also be included within the protection scope of the present invention and are incorporated here by reference.

The above modules work constantly therebetween. Here, those skilled in the art should understand that "constantly" means the above various modules perform obtaining the voice input information, determining an input character sequence, obtaining accuracy information, transmitting and obtaining the input character sequence and the accuracy information, providing the input character sequence, respectively in real-time or according a preset or real-time adjusted working pattern requirements, until the network device stops obtaining the voice input information.

The input obtaining module 11 of the network device 1 obtains the voice input information. Specifically, the input obtaining module 11 interacts with the voice input information database of the third party to obtain the voice input information via all kinds of data transmission interfaces based on various communications protocols; or, the input obtaining module 11 obtains in real time the voice input information input by the user, or interacts with the user device to obtain the voice input information input by the user in real time. Here, the voice input information includes, but not limited to, words, terms, short sentences or long sentences, and etc.

The sequence determining module 12 determines an input character sequence corresponding to the voice input information based on a voice recognition model. Specifically, the sequence determining module 12 obtains one or more input syllables corresponding to the voice input information by, for example, segmenting the voice input information in accordance with the preset or learned voice recognition model, and matches the feature vectors of the input syllables with the templates in the voice recognition model in sequence to thereby obtain one or more word segments or candidate word segments corresponding to the syllables; it matches the input syllables in sequence to thereby determine an input character sequence corresponding to the voice input information, wherein the input character sequence includes multiple word segments or candidate word segments corresponding to the voice input information. Here, the voice recognition model includes, but not limited to, a general voice recognition model, or a specific voice recognition model only corresponding to the current user; the voice recognition model is obtained through voice training. For example, if the voice input information corresponds to a sentence "I bring you to JinZhou", the sequence determining module 12 segments the voice input information to obtain multiple word segments corresponding to the voice input information; for example, I, bring, you, to, JinZhou; wherein the position of "bring" may have other candidate word segments, such as "replace, stay, silly (10%)" (In Chinese, these three words are homophones with "bring"), and the position of "JinZhou" may also have other candidate word segments, such as "Golden Zhou, Jin Zhou" (in Chinese, "Golden" and "Jin" are homophones, and they are both place names), etc.

The accuracy determining module 13 determines appearance probability information corresponding to word segments in the input character sequence so as to obtain accuracy information of the word segments. Specifically, the accuracy determining module 13 determines the appearance probability information corresponding to the word segments in the input character sequence through information that is obtained from machine study or obtained by inquiring the corresponding appearance probability information database; and then it obtains the accuracy information of the word segments in a manner of taking the appearance probability information directly as the accuracy information of the word segments based on the appearance probability information; or, the accuracy determining means 13 processes the appearance probability information to obtain the accuracy information of the word segments based on context information of the word segments in the input character sequence or the information relating to the part of speech of the word segments. For instance, following the above example, the accuracy determining module 13 obtains, via interacting with an appearance probability information database, the appearance probability information (as shown in parentheses) corresponding to the word segments in the sentence "I bring you to JinZhou" that corresponds to the voice input information, I (90%), bring (40%), you (90%), to (98%), and JinZhou (40%), wherein the position of "bring" may have other candidate word segments, such as "replace (30%), stay (20%), and silly (10%)", the position of "JinZhou" may also have other candidate word segments, such as "Golden Zhou (30%), Jin Zhou (30%)", etc.; the accuracy determining means 13 directly corresponds the appearance probability information to the accuracy information of the word segments, for example, the accuracy information of "I" is 90%.

The transmitting module 14 transmits the input character sequence and the accuracy information of the word segments to a user device corresponding to the voice input information. Specifically, the transmitting module 14 obtains, from the accuracy determining module 13, an input character sequence consisting of one or more word segments or candidate word segments and accuracy information of the word segments, it transmits the input character sequence and the accuracy information of the word segments to a user device corresponding to the voice input information based on various communications protocols, via Application Program Interfaces(APIs) provide by the user device, or in accordance with the format requirements of other appointed communications manners.

Accordingly, the sequence obtaining module 21 obtains an input character sequence corresponding to voice input information transmitted by a network device and accuracy information of word segments in the input character sequence. Specifically, the sequence obtaining module 21 receives, from the network device, an input character sequence that consists of one or more word segments or candidate word segments corresponding to the voice input information and the accuracy information of the word segments based on various communications protocols, via Application Program Interfaces (APIs) provide by the network device or in accordance with the format requirements of other appointed communications manners.

The providing module 22 provides the input character sequence to a user based on accuracy information of the word segments. Specifically, based on the input character sequence obtained from the sequence obtaining module 21 and the accuracy information of word segments in the input character sequence, the providing module 22 generates an input character sequence provided to the user by means of combining the word segments that best correspond to the accuracy information of the same input syllable; or the providing module 22 generates an input character sequence provided to the user after sorting from high to low all word segments or candidate word segments that correspond to the same input syllable according to accuracy, wherein the input character sequence includes all matching word segments, etc.; the providing module 22 provides the user with the input character sequence through interacting with the user based on various communications protocols and via APIs provided by the user device corresponding to the user. Here, the user includes, but not limited to, the user corresponding to providing the voice input information, or the user specified for receiving the voice input information.

Preferably, the accuracy determining module 13 could determine a conditional probability of the word segment in the input character sequence as appearance probability information of the word segment; and determine accuracy information of the word segment based on an appearance probability threshold value and the appearance probability information of the word segment. Specifically, the accuracy determination module 13 is also able to obtain directly a condition probability of the word segments in the input character sequence; or it obtains firstly probability P (B) that the input character sequence appears, then obtains probability P(AB) when the input character sequence includes the word segments, thereby calculating a condition probability P (A|B) indicating the appearance of the word segments in the input character sequence, then the condition probability P (A|B) is taken as the appearance probability information of the word segments. The accuracy determining module 13 obtains an appearance probability threshold value in a preset manner or via machine study, for example, it takes one or more word segments whose appearance probability information is higher than the appearance probability threshold value as the accurate word segments, if the appearance probability information of the word segments is lower than the appearance probability threshold value, then these word segments are determined as inaccurate word segments, the accuracy information of the word segment is thus determined.

More preferably, the network device further comprises a threshold value determining module (not shown), wherein, the threshold value determining module 14 determines the appearance probability threshold value based on the appearance probability information of the word segment and the appearance probability information of candidate word segment(s) corresponding to the word segment. Specifically, the threshold value determining module may obtain appearance probability information of the word segments and the candidate word segments corresponding to the word segments and determine the appearance probability threshold value in a manner of, for example, taking an average value, a weighted average, and a median value of one or more word segments and candidate word segments. For example, if the appearance probability information of the word segments and candidate word segments is {40%, 10%, 10%, 20%, 20%}, the threshold value can be taken as 30%-40%, and is not necessary to be limited to 50%; for example, if the appearance probability information of the word segments and candidate word segments is {50%, 45%, 5%}, even if the appearance probability threshold value is taken as 50%, it is still very possible to be errors.

Preferably, the sequence determining module 12 could determine an input character sequence corresponding to the voice input information based on a voice recognition model in conjunction with context information corresponding to the voice input information. Specifically, the sequence determining module 12 determines a corresponding voice recognition model through, for example, combining context information corresponding to the voice input information, for example, according to keywords in the context information, the sequence determining module 12 judges voice recognition models corresponding to different fields, then determines the input character sequence corresponding to the voice input information based on the voice recognition model; or it determines the input character sequence with a universal voice recognition model, and adjusts the input character sequence in combination with the context information such as improving the weight or priority level of the character sequence which matches the context, wherein the manner of determining the input character sequence is same as or similar to the determining manner of the sequence determining module 12 in FIG. 1, which are thus not detailed here, but incorporated here by reference.

Figure 2:
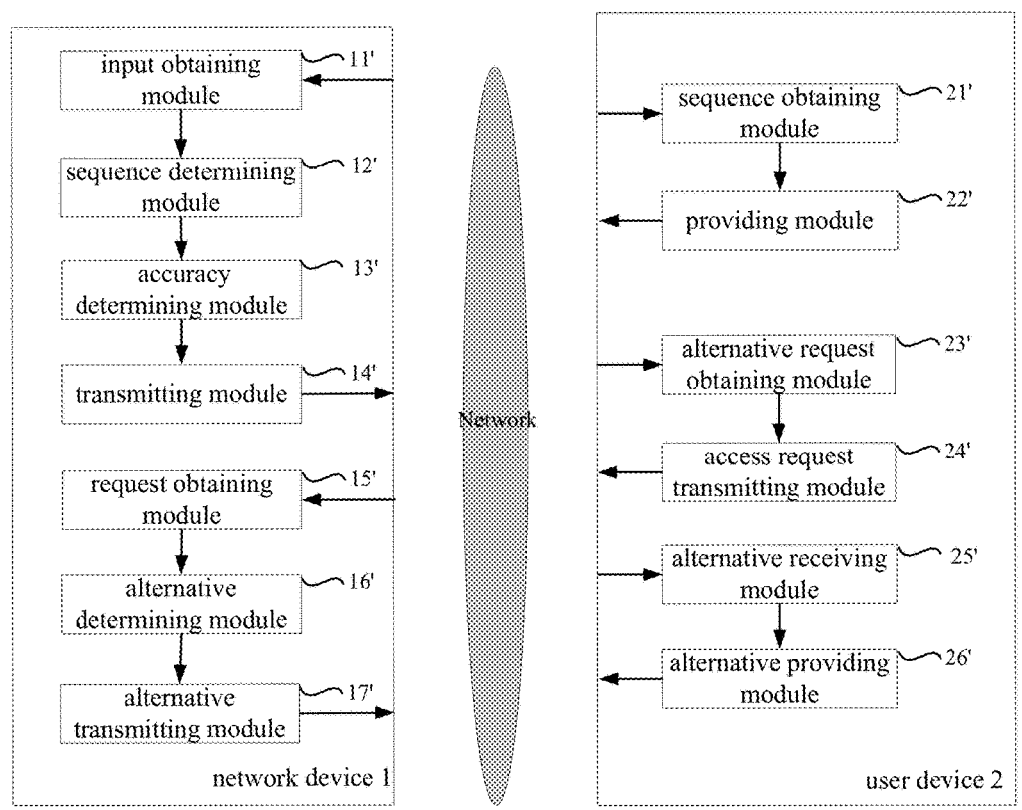
FIG. 2 shows a schematic diagram of the network device and the user device for implementing voice input according to one preferred embodiment of the present invention.

FIG. 2 shows a schematic diagram of the network device and the user device for implementing voice input according to one preferred embodiment of the present invention; wherein, the network device 1 comprises an input obtaining module 11', a sequence determining module 12', an accuracy determining module 13', a transmitting module 14', a request obtaining module 15', an alternative determining module 16', an alternative transmitting module 17'; the user device 2 comprises a sequence obtaining module 21', a providing module 22', an alternative request obtaining module 23', an access request transmitting module 24', an alternative receiving module 25', an alternative providing module 26'; the modules of the network device 1 and the user device 2 work in coordination for implementing voice input. Specifically, the input obtaining module 11' of the network device 1 obtains the voice input information; the sequence determining module 12' determines an input character sequence corresponding to the voice input information based on a voice recognition model; the accuracy determining module 13' determines appearance probability information corresponding to word segments in the input character sequence so as to obtain accuracy information of the word segments; the transmitting module 14' transmits the input character sequence and the accuracy information of the word segments to a user device corresponding to the voice input information; accordingly, the sequence obtaining module 21' obtains an input character sequence corresponding to voice input information transmitted by a network device and accuracy information of word segments in the input character sequence; the providing module 22' provides the input character sequence to a user based on accuracy information of the word segments; the alternative request obtaining module 23' obtains the user's request operation on alternative items of at least one word segment in the input character sequence; the access request transmitting module 24' transmits an access request for alternative items of at least one of the word segments to the network device based on the request operation; accordingly, the request obtaining module 15' obtains an access request for alternative items of at least one of the word segments transmitted by the user device; the alternative determining module 16' determines one or more alternative items corresponding to at least one of the word segments based on the access request; the alternative transmitting module 17' transmits the one or more alternative items to the user device; accordingly, the alternative receiving module 25' receives one or more alternative items transmitted by the network device based on the access request; the alternative providing module 26' provides at least one of the one or more alternative items to the user. Herein, the obtaining module 11', the sequence determining module 12', the accuracy determining module 13' and the transmitting module 14' of the network device 1, and the sequence obtaining module 21' and the providing module 22' of the user device 2 are identical or substantially identical to corresponding modules shown in FIG. 1, which are thus not detailed here, but incorporated here by reference.

The above modules work constantly therebetween. Here, those skilled in the art should understand that "constantly" means the above various modules perform obtaining the voice input information, determining an input character sequence, obtaining accuracy information, transmitting and obtaining the input character sequence and the accuracy information, providing the input character sequence, obtaining the user's request operation on alternative items, transmitting and obtaining an access request for alternative items, determining one or more alternative items, transmits and receiving the one or more alternative items, providing alternative items, respectively in real-time or according a preset or real-time adjusted working pattern requirements, until the network device stops obtaining the voice input information.

The alternative request obtaining module 23' obtains the user's request operation on alternative items of at least one word segment in the input character sequence. Specifically, the alternative request obtaining module 23' obtains, based on various communications protocols and via all kinds of application program interfaces, the user's request operation on alternative items of at least one of the word segments in the input character sequence from the third party device, or obtains a request operation by directly interacting with the user, wherein the request operation includes, but is not limited to, input, click, touch, and etc. For instance, following the above example, the alternative request obtaining module 23' directly interacts with the user and obtains the user's request for alternative items of "JinZhou" that is input by clicking.

The access request transmitting module 24' transmits an access request for alternative items of at least one of the word segments to the network device based on the request operation. Specifically, the access request transmitting module 24' transmits, based on the request operation, an access request relating to alternative items of at least one of the word segments to the network device based on various communications protocols, via APIs provided by the network device, or in accordance with the format requirements of other appointed communications modes.

Accordingly, the request obtaining module 15' obtains an access request for alternative items of at least one of the word segments transmitted by the user device. Specifically, the request obtaining module 15' receives from the user device an access request relating to alternative items of at least one of the word segments based on various communications protocols, via APIs provided by the user device, or in accordance with the format requirements of other appointed communications modes.

The alternative determining module 16' determines one or more alternative items corresponding to at least one of the word segments based on the access request. Specifically, according to the access request obtained by the request obtaining module 15' and the word segment that needs to be obtained in the access request, the alternative determining module 16' directly obtains candidate word segments of the word segment in the sequence determining module 12' and takes the candidate word segments as alternative items; or it re-processes the word segment to obtain one or more alternative items corresponding to at least one of the word segments, wherein the processing method is same as or similar to the method of the sequence determining module 12', which are thus not detailed here, but incorporated here by reference.

The alternative transmitting module 17' transmits the one or more alternative items to the user device. Specifically, the alternative transmitting module 17' obtains one or more alternative items determined by the alternative determining module 16' and transmits the one or more alternative items to the user device based on various communications protocols, via APIs provided by the user device, or in accordance with the format requirements of other appointed communications modes.

Accordingly, the alternative receiving module 25' receives one or more alternative items transmitted by the network device based on the access request. Specifically, the alternative receiving module 25' receives from the network device one or more alternative items as transmitted upon the access request based on various communications protocols, via APIs provided by the network device, or in accordance with the format requirements of other appointed communications modes.

The alternative providing module 26' provides at least one of the one or more alternative items to the user. Specifically, the alternative providing module 26' provides, based on one or more alternative items obtained by the alternative receiving module 25' and in a manner that is preset by system or set by users, the user with at least one of the one or more alternative items through interacting with the user; or provides the user with at least one of the one or more alternative items based on various communications protocols and via APIs provided by the user device corresponding to the user. Here, the user includes but is not limited to a user corresponding to that providing the voice input information, or a user designated for receiving the voice input information.

Preferably, the alternative determining module 16' of the network device 1 could determine, based on the access request in conjunction with context information of at least one of the word segments, one or more alternative items corresponding to at least one of the word segments. Specifically, the alternative determining module 16' could determine, based on the access request and in conjunction with context information of segments in the access request, one or more alternative items corresponding to the at least one segment. For example, according to context information and in conjunction with the information like common collocation or grammar, the alternative determining module 16' screens the alternative items that poorly match the context information; for example, as for the voice input information "I bring you to JinZhou", if the segment of the alternative item that needs to be obtained is 'JinZhou', considering that the word "to" is a direction word, the corresponding alternative item may be "Golden Zhou" or "Jin Zhou", while "Imprison Curse" will not be included. (in Chinese, "GoldenZhou", "JinZhou" and "Imprison Curse" are homophones)

Preferably, the user device 2 further comprises an operation obtaining module (not shown) and a replacing module (not shown), wherein, the operation obtaining module obtains the user's select operation on at least one of the one or more alternative items; the replacing module replaces the corresponding word segments in the input character sequence based on the alternative item corresponding to the select operation so as to obtain the updated input character sequence. Specifically, the operation obtaining module obtains the user's select operation on at least one of the one or more alternative items through directly interacting with the user, or via APIs set by the third party that is able to provide the select operation; for example, the user selects one of one or more alternative items by clicking, then the operation obtaining module obtains the select operation and the selected alternative item. The replacing module obtains the alternative item selected by the operation obtaining module, and uses the alternative item to replace the corresponding word segment in the input character sequence for obtaining the updated input character sequence. For instance, following the above example, the user selects the alternative item "Golden Zhou", then the replacing module replaces the "Jin Zhou" with "Golden Zhou", the updated input character sequence is "I bring you to Golden Zhou".

Figure 3:
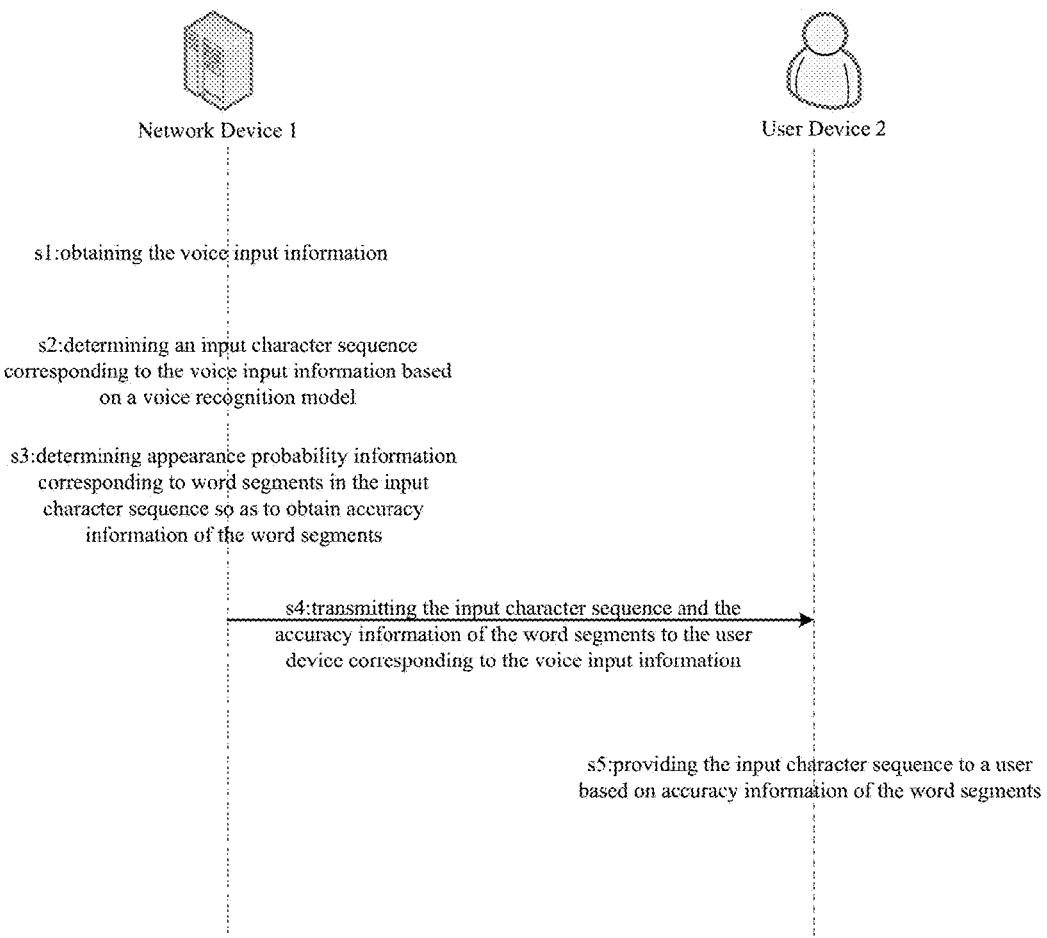
FIG. 3 shows a flow diagram of a method for implementing voice input by cooperation of the network device and the user device according to another aspect of the present invention.

FIG. 3 shows a flow diagram of a method for implementing voice input by cooperation of the network device and the user device according to another aspect of the present invention. Specifically, in the step s1, the network device 1 obtains the voice input information; in the step s2, the network device 1 determines an input character sequence corresponding to the voice input information based on a voice recognition model; in the step s3, the network device 1 determines appearance probability information corresponding to word segments in the input character sequence so as to obtain accuracy information of the word segments; in the step s4, the network device 1 transmits the input character sequence and the accuracy information of the word segments to a user device corresponding to the voice input information; accordingly, in the step s4, the user device 2 obtains an input character sequence corresponding to voice input information transmitted by a network device and accuracy information of word segments in the input character sequence; in the step s5, the user device 2 provides the input character sequence to a user based on accuracy information of the word segments.

The above steps work constantly therebetween. Here, those skilled in the art should understand that "constantly" means the above various steps perform obtaining the voice input information, determining an input character sequence, obtaining accuracy information, transmitting and obtaining the input character sequence and the accuracy information, providing the input character sequence, respectively in real-time or according a preset or real-time adjusted working pattern requirements, until the network device stops obtaining the voice input information.

In the step s1, the network device 1 obtains the voice input information. Specifically, in the step s1, the network device 1 interacts with the voice input information database of the third party to obtain the voice input information via all kinds of data transmission interfaces based on various communications protocols; or, in the step s1, the network device 1 obtains in real time the voice input information input by the user, or interacts with the user device to obtain the voice input information input by the user in real time. Here, the voice input information includes, but not limited to, words, terms, short sentences or long sentences, and etc.

In the step s2, the network device 1 determines an input character sequence corresponding to the voice input information based on a voice recognition model. Specifically, in the step s2, the network device 1 obtains one or more input syllables corresponding to the voice input information by, for example, segmenting the voice input information in accordance with the preset or learned voice recognition model, and matches the feature vectors of the input syllables with the templates in the voice recognition model in sequence to thereby obtain one or more word segments or candidate word segments corresponding to the syllables; it matches the input syllables in sequence to thereby determine an input character sequence corresponding to the voice input information, wherein the input character sequence includes multiple word segments or candidate word segments corresponding to the voice input information. Here, the voice recognition model includes, but not limited to, a general voice recognition model, or a specific voice recognition model only corresponding to the current user; the voice recognition model is obtained through voice training. For example, if the voice input information corresponds to a sentence "I bring you to JinZhou", in the step s2, the network device 1 segments the voice input information to obtain multiple word segments corresponding to the voice input information; for example, I, bring, you, to, JinZhou; wherein the position of "bring" may have other candidate word segments, such as "replace, stay, silly (10%)" (in Chinese, these three words are homophones with "bring"), and the position of "JinZhou" may also have other candidate word segments, such as "Golden Zhou, Jin Zhou" (in Chinese, "Golden" and "Jin" are homophones, and they are both place names), etc.

In the step s3, the network device 1 determines appearance probability information corresponding to word segments in the input character sequence so as to obtain accuracy information of the word segments. Specifically, in the step s3, the network device 1 determines the appearance probability information corresponding to the word segments in the input character sequence through information that is obtained from machine study or obtained by inquiring the corresponding appearance probability information database; and then it obtains the accuracy information of the word segments in a manner of taking the appearance probability information directly as the accuracy information of the word segments based on the appearance probability information; or, in the step s3, the network device 1 processes the appearance probability information to obtain the accuracy information of the word segments based on context information of the word segments in the input character sequence or the information relating to the part of speech of the word segments. For instance, following the above example, in the step s3, the network device 1 obtains, via interacting with an appearance probability information database, the appearance probability information (as shown in parentheses) corresponding to the word segments in the sentence "I bring you to JinZhou" that corresponds to the voice input information, I (90%), bring (40%), you (90%), to (98%), and JinZhou (40%), wherein the position of "bring" may have other candidate word segments, such as "replace (30%), stay (20%), and silly (10%)", the position of "JinZhou" may also have other candidate word segments, such as "Golden Zhou (30%), Jin Zhou (30%)", etc.; in the step s3, the network device 1 directly corresponds the appearance probability information to the accuracy information of the word segments, for example, the accuracy information of "I" is 90%.

In the step s4, the network device 1 transmits the input character sequence and the accuracy information of the word segments to a user device corresponding to the voice input information. Specifically, in the step s4, the network device 1 obtains, from the step s3, an input character sequence consisting of one or more word segments or candidate word segments and accuracy information of the word segments, it transmits the input character sequence and the accuracy information of the word segments to a user device corresponding to the voice input information based on various communications protocols, via Application Program Interfaces (APIs) provide by the user device, or in accordance with the format requirements of other appointed communications manners.

Accordingly, in the step s4, the user device 2 obtains an input character sequence corresponding to voice input information transmitted by a network device and accuracy information of word segments in the input character sequence. Specifically, in the step s4, the user device 2 receives, from the network device, an input character sequence that consists of one or more word segments or candidate word segments corresponding to the voice input information and the accuracy information of the word segments based on various communications protocols, via Application Program Interfaces (APIs) provide by the network device or in accordance with the format requirements of other appointed communications manners.

In the step s5, the user device 2 provides the input character sequence to a user based on accuracy information of the word segments. Specifically, based on the input character sequence obtained from the step s4 and the accuracy information of word segments in the input character sequence, in the step s5, the user device 2 generates an input character sequence provided to the user by means of combining the word segments that best correspond to the accuracy information of the same input syllable; or in the step s5, the user device 2 generates an input character sequence provided to the user after sorting from high to low all word segments or candidate word segments that correspond to the same input syllable according to accuracy, wherein the input character sequence includes all matching word segments, etc.; in the step s5, the user device 2 provides the user with the input character sequence through interacting with the user based on various communications protocols and via APIs provided by the user device corresponding to the user. Here, the user includes, but not limited to, the user corresponding to providing the voice input information, or the user specified for receiving the voice input information.

Preferably, in the step s3, the network device 1 could determine a conditional probability of the word segment in the input character sequence as appearance probability information of the word segment; and determine accuracy information of the word segment based on an appearance probability threshold value and the appearance probability information of the word segment. Specifically, in the step s3, the network device 1 is also able to obtain directly a condition probability of the word segments in the input character sequence; or it obtains firstly probability P (B) that the input character sequence appears, then obtains probability P(AB) when the input character sequence includes the word segments, thereby calculating a condition probability P (A|B) indicating the appearance of the word segments in the input character sequence, then the condition probability P (A|B) is taken as the appearance probability information of the word segments. In the step s3, the network device 1 obtains an appearance probability threshold value in a preset manner or via machine study, for example, it takes one or more word segments whose appearance probability information is higher than the appearance probability threshold value as the accurate word segments, if the appearance probability information of the word segments is lower than the appearance probability threshold value, then these word segments are determined as inaccurate word segments, the accuracy information of the word segment is thus determined.

More preferably, the method further comprises a step s11 (not shown), wherein, in the step s11, the network device 1 determines the appearance probability threshold value based on the appearance probability information of the word segment and the appearance probability information of candidate word segment(s) corresponding to the word segment. Specifically, in the step s11, the network device 1 may obtain appearance probability information of the word segments and the candidate word segments corresponding to the word segments and determine the appearance probability threshold value in a manner of, for example, taking an average value, a weighted average, and a median value of one or more word segments and candidate word segments. For example, if the appearance probability information of the word segments and candidate word segments is {40%, 10%, 10%, 20%, 20%}, the threshold value can be taken as 30%-40%, and is not necessary to be limited to 50%; for example, if the appearance probability information of the word segments and candidate word segments is {50%, 45%, 5%}, even if the appearance probability threshold value is taken as 50%, it is still very possible to be errors.

Preferably, in the step s2, the network device 1 could determine an input character sequence corresponding to the voice input information based on a voice recognition model in conjunction with context information corresponding to the voice input information. Specifically, in the step s2, the network device 1 determines a corresponding voice recognition model through, for example, combining context information corresponding to the voice input information, for example, according to keywords in the context information, in the step s2, the network device 1 judges voice recognition models corresponding to different fields, then determines the input character sequence corresponding to the voice input information based on the voice recognition model; or it determines the input character sequence with a universal voice recognition model, and adjusts the input character sequence in combination with the context information such as improving the weight or priority level of the character sequence which matches the context, wherein the manner of determining the input character sequence is same as or similar to the determining manner of the step s2 in FIG. 3, which are thus not detailed here, but incorporated here by reference.

Figure 4:
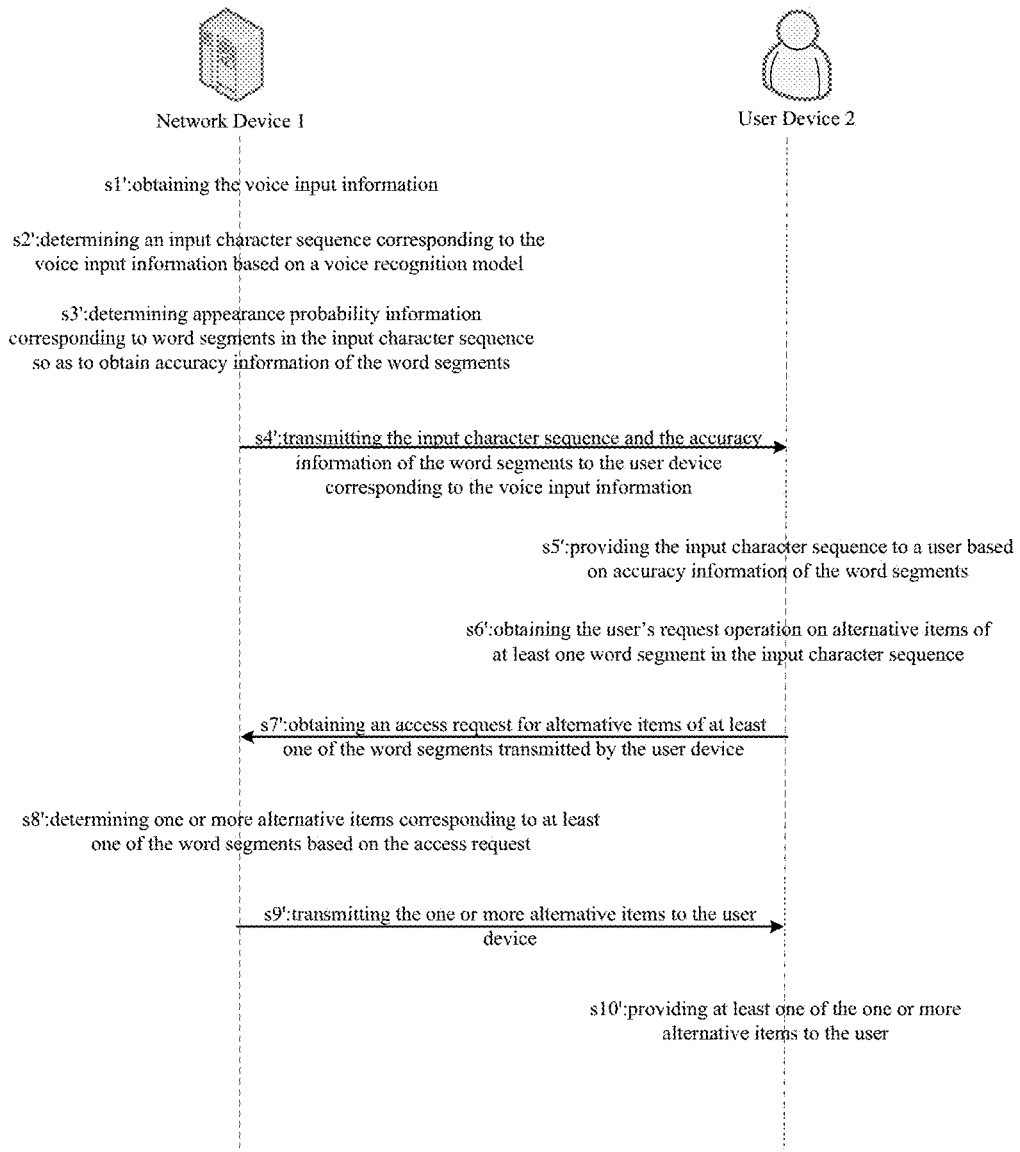
FIG. 4 shows a flow diagram of a method for implementing voice input by cooperation of the network device and the user device according to one preferred embodiment of the present invention.

FIG. 4 shows a flow diagram of a method for implementing voice input by cooperation of the network device and the user device according to one preferred embodiment of the present invention. Specifically, in the step s1', the network device 1 obtains the voice input information; in the step s2', the network device 1 determines an input character sequence corresponding to the voice input information based on a voice recognition model; in the step s3', the network device 1 determines appearance probability information corresponding to word segments in the input character sequence so as to obtain accuracy information of the word segments; in the step s4', the network device 1 transmits the input character sequence and the accuracy information of the word segments to a user device corresponding to the voice input information; accordingly, in the step s4', the user device 2 obtains an input character sequence corresponding to voice input information transmitted by a network device and accuracy information of word segments in the input character sequence; in the step s5', the user device 2 provides the input character sequence to a user based on accuracy information of the word segments; in the step s6', the user device 2 obtains the user's request operation on alternative items of at least one word segment in the input character sequence; in the step s7', the user device 2 transmits an access request for alternative items of at least one of the word segments to the network device based on the request operation; accordingly, in the step s7', the network device 1 obtains an access request for alternative items of at least one of the word segments transmitted by the user device; in the step s8', the network device 1 determines one or more alternative items corresponding to at least one of the word segments based on the access request; in the step s9', the network device 1 transmits the one or more alternative items to the user device; accordingly, in the step s9', the user device 2 receives one or more alternative items transmitted by the network device based on the access request; in the step s10', the user device 2 provides at least one of the one or more alternative items to the user. Herein, the step s1', the step s2', the step s3', the step s4', the step s5' are identical or substantially identical to corresponding steps shown in FIG. 3, which are thus not detailed here, but incorporated here by reference.

The above steps work constantly therebetween. Here, those skilled in the art should understand that "constantly" means the above various steps perform obtaining the voice input information, determining an input character sequence, obtaining accuracy information, transmitting and obtaining the input character sequence and the accuracy information, providing the input character sequence, obtaining the user's request operation on alternative items, transmitting and obtaining an access request for alternative items, determining one or more alternative items, transmits and receiving the one or more alternative items, providing alternative items, respectively in real-time or according a preset or real-time adjusted working pattern requirements, until the network device stops obtaining the voice input information.

In the step s6', the user device 2 obtains the user's request operation on alternative items of at least one word segment in the input character sequence. Specifically, in the step s6', the user device 2 obtains, based on various communications protocols and via all kinds of application program interfaces, the user's request operation on alternative items of at least one of the word segments in the input character sequence from the third party device, or obtains a request operation by directly interacting with the user, wherein the request operation includes, but is not limited to, input, click, touch, and etc. For instance, following the above example, in the step s6', the user device 2 directly interacts with the user and obtains the user's request for alternative items of "JinZhou" that is input by clicking.

In the step s7', the user device 2 transmits an access request for alternative items of at least one of the word segments to the network device based on the request operation. Specifically, in the step s7', the user device 2 transmits, based on the request operation, an access request relating to alternative items of at least one of the word segments to the network device based on various communications protocols, via APIs provided by the network device, or in accordance with the format requirements of other appointed communications modes.

Accordingly, in the step s7', the network device 1 obtains an access request for alternative items of at least one of the word segments transmitted by the user device. Specifically, in the step s7', the network device 1 receives from the user device an access request relating to alternative items of at least one of the word segments based on various communications protocols, via APIs provided by the user device, or in accordance with the format requirements of other appointed communications modes.

In the step s8', the network device 1 determines one or more alternative items corresponding to at least one of the word segments based on the access request. Specifically, according to the access request obtained by the step s7' and the word segment that needs to be obtained in the access request, in the step s8', the network device 1 directly obtains candidate word segments of the word segment in the step s2' and takes the candidate word segments as alternative items; or it re-processes the word segment to obtain one or more alternative items corresponding to at least one of the word segments, wherein the processing method is same as or similar to the method of the step s2', which are thus not detailed here, but incorporated here by reference.

In the step s9', the network device 1 transmits the one or more alternative items to the user device. Specifically, in the step s9', the network device 1 obtains one or more alternative items determined by the step s8' and transmits the one or more alternative items to the user device based on various communications protocols, via APIs provided by the user device, or in accordance with the format requirements of other appointed communications modes.

Accordingly, in the step s9', the user device 2 receives one or more alternative items transmitted by the network device based on the access request. Specifically, in the step s9', the user device 2 receives from the network device one or more alternative items as transmitted upon the access request based on various communications protocols, via APIs provided by the network device, or in accordance with the format requirements of other appointed communications modes.

In the step s10', the user device 2 provides at least one of the one or more alternative items to the user. Specifically, in the step s10', the user device 2 provides, based on one or more alternative items obtained by the step s9' and in a manner that is preset by system or set by users, the user with at least one of the one or more alternative items through interacting with the user; or provides the user with at least one of the one or more alternative items based on various communications protocols and via APIs provided by the user device corresponding to the user. Here, the user includes but is not limited to a user corresponding to that providing the voice input information, or a user designated for receiving the voice input information.

Preferably, in the step s8', the network device 1 of the network device 1 could determine, based on the access request in conjunction with context information of at least one of the word segments, one or more alternative items corresponding to at least one of the word segments. Specifically, in the step s8', the network device 1 could determine, based on the access request and in conjunction with context information of segments in the access request, one or more alternative items corresponding to the at least one segment. For example, according to context information and in conjunction with the information like common collocation or grammar, in the step s8', the network device 1 screens the alternative items that poorly match the context information; for example, as for the voice input information "I bring you to JinZhou", if the segment of the alternative item that needs to be obtained is 'JinZhou', considering that the word "to" is a direction word, the corresponding alternative item may be "Golden Zhou" or "Jin Zhou", while "Imprison Curse" will not be included. (in Chinese, "GoldenZhou", "JinZhou" and "Imprison Curse" are homophones)

Preferably, the method further comprises a step s12' (not shown) and a step s13' (not shown), wherein, in the step s12', the user device 2 obtains the user's select operation on at least one of the one or more alternative items; in the step s13', the user device 2 replaces the corresponding word segments in the input character sequence based on the alternative item corresponding to the select operation so as to obtain the updated input character sequence. Specifically, in the step s12', the user device 2 obtains the user's select operation on at least one of the one or more alternative items through directly interacting with the user, or via APIs set by the third party that is able to provide the select operation; for example, the user selects one of one or more alternative items by clicking, then in the step s12', the user device 2 obtains the select operation and the selected alternative item. In the step s13', the user device 2 obtains the alternative item selected by the step s12', and uses the alternative item to replace the corresponding word segment in the input character sequence for obtaining the updated input character sequence. For instance, following the above example, the user selects the alternative item "Golden Zhou", then in the step s13', the user device 2 replaces the "Jin Zhou" with "Golden Zhou", the updated input character sequence is "I bring you to Golden Zhou".

Aspects of various embodiments are specified in the claims. Those and other aspects of various embodiments are specified in the following numbered clauses:

1. A method for implementing voice input in a network device, wherein the method comprises the following steps:
    a. obtaining the voice input information;
    b. determining an input character sequence corresponding to the voice input information based on a voice recognition model;
    c. determining appearance probability information corresponding to word segments in the input character sequence so as to obtain accuracy information of the word segments;
    d. transmitting the input character sequence and the accuracy information of the word segments to a user device corresponding to the voice input information.

2. The method of clause 1, wherein the method further comprises:
    obtaining an access request for alternative items of at least one of the word segments transmitted by the user device;
    x. determining one or more alternative items corresponding to at least one of the word segments based on the access request;
    transmitting the one or more alternative items to the user device.

3. The method of clause 2, wherein the step x comprises:
    determining, based on the access request in conjunction with context information of at least one of the word segments, one or more alternative items corresponding to at least one of the word segments.

4. The method of any one of clauses 1-3, wherein the step c comprises:
    determining a conditional probability of the word segments in the input character sequence as appearance probability information of the word segments;
    determining accuracy information of the word segments based on an appearance probability threshold value and the appearance probability information of the word segments.

5. The method of clause 4, wherein the method further comprises:
determining the appearance probability threshold value based on the appearance probability information of the word segments and the appearance probability information of candidate word segment(s) corresponding to the word segments.

6. The method of any one of clauses 1-5, wherein the step b comprises:
determining an input character sequence corresponding to the voice input information based on a voice recognition model in conjunction with context information corresponding to the voice input information.

7. A method for implementing voice input subsidiarily in a user device, wherein the method comprises the following steps:
A. obtaining an input character sequence corresponding to voice input information transmitted by a network device and accuracy information of word segments in the input character sequence;
B. providing the input character sequence to a user based on accuracy information of the word segments.

8. The method of clause 7, wherein the method further comprises:
obtaining the user's request operation on alternative items of at least one word segment in the input character sequence;
transmitting an access request for alternative items of at least one of the word segments to the network device based on the request operation;
receiving one or more alternative items transmitted by the network device based on the access request;
providing at least one of the one or more alternative items to the user.

9. The method of clause 8, wherein the method further comprises:
obtaining the user's select operation on at least one of the one or more alternative items;
replacing the corresponding word segments in the input character sequence based on the alternative items corresponding to the select operation so as to obtain the updated input character sequence.

10. A network device for implementing voice input, wherein the device comprises:
an input obtaining module for obtaining the voice input information;
a sequence determining module for determining an input character sequence corresponding to the voice input information based on a voice recognition model;
an accuracy determining module for determining appearance probability information corresponding to word segments in the input character sequence so as to obtain accuracy information of the word segments;
a transmitting module for transmitting the input character sequence and the accuracy information of the word segments to a user device corresponding to the voice input information.

11. The network device of clause 10, wherein the device further comprises:
a request obtaining module for obtaining an access request for alternative items of at least one of the word segments transmitted by the user device;
an alternative determining module for determining one or more alternative items corresponding to at least one of the word segments based on the access request;
an alternative transmitting module for transmitting the one or more alternative items to the user device.

12. The network device of clause 11, wherein the alternative determining module is used for:
determining, based on the access request in conjunction with context information of at least one of the word segments, one or more alternative items corresponding to at least one of the word segments.

13. The network device of any one of clauses 10-12, wherein the accuracy determining module is used for:
determining a conditional probability of the word segments in the input character sequence as appearance probability information of the word segments;
determining accuracy information of the word segments based on an appearance probability threshold value and the appearance probability information of the word segments.

14. The network device of clause 13, wherein the device further comprises:
a threshold value determining module for determining the appearance probability threshold value based on the appearance probability information of the word segments and the appearance probability information of candidate word segment(s) corresponding to the word segments.

15. The network device of any one of clauses 10-14, wherein the sequence determining module is used for:
determining an input character sequence corresponding to the voice input information based on a voice recognition model in conjunction with context information corresponding to the voice input information.

16. A user device for implementing voice input subsidiarily, wherein the device comprises:
a sequence obtaining module for obtaining an input character sequence corresponding to voice input information transmitted by a network device and accuracy information of word segments in the input character sequence;
a providing module for providing the input character sequence to a user based on accuracy information of the word segments.

17. The user device of clause 16, wherein the device further comprises:
an alternative request obtaining module for obtaining the user's request operation on alternative items of at least one word segment in the input character sequence;
an access request transmitting module for transmitting an access request for alternative items of at least one of the word segments to the network device based on the request operation;
an alternative receiving module for receiving one or more alternative items transmitted by the network device based on the access request;
an alternative providing module for providing at least one of the one or more alternative items to the user.

18. The user device of clause 17, wherein the device further comprises:
an operation obtaining module for obtaining the user's select operation on at least one of the one or more alternative items;
a replacing module for replacing the corresponding word segments in the input character sequence based on the alternative items corresponding to the select operation so as to obtain the updated input character sequence.

19. A system for implementing voice input, comprising a network device according to any one of clauses 10-15 and a user device according to any one of clauses 16-18.

To those skilled in the art, apparently the present invention is not limited to the details of the aforementioned exemplary embodiments; moreover, under the premise of not deviating from the spirit or fundamental characteristics of the invention, this invention can be accomplished in other specific forms. Therefore, the embodiments should be considered exemplary and non-restrictive no matter from which point, the scope of the invention is defined by the appended claims instead of the above description, and aims at covering the meanings of the equivalent components falling into the claims and all changes within the scope in this invention. Any reference sign in the claims shall not be deemed as limiting the concerned claims. Besides, apparently the word "comprise/include" does not exclude other components or steps, singular numbers does not exclude complex numbers, the plurality of components or means mentioned in device claims may also be accomplished by one component or means through software or hardware, the wording like first and second are only used to represent names rather than any specific order.

What is claimed is:

1. A method comprising implementing voice input in a network device, wherein implementing voice input comprises:
   obtaining voice input information;
   determining voice recognition models in different fields corresponding to the voice input information based on keywords in the context information corresponding to the voice input information;
   obtaining one or more input syllables corresponding to the voice input information based on the voice recognition models;
   determining one or more word segments corresponding to the each syllable based on the input syllables;
   matching the input syllables in sequence to thereby determine an input character sequence corresponding to the voice input information, wherein, the input character sequence includes multiple word segments corresponding to the voice input information and at least two word segments correspond to a same input syllable and are homophones;
   determining a conditional probability of the word segments in the input character sequence as appearance probability information of the word segments;
   determining an appearance probability threshold value based on the appearance probability information of the word segments and the appearance probability information of at least one candidate word segment corresponding to the word segments;
   determining accuracy information of the word segments based on the appearance probability threshold value and the appearance probability information of the word segments; and
   transmitting the input character sequence and the accuracy information of the word segments to a user device corresponding to the voice input information.

2. The method of claim 1, further comprising:
   obtaining an access request for alternative items of at least one of the word segments transmitted by the user device;
   determining one or more alternative items corresponding to at least one of the word segments based on the access request; and
   transmitting the one or more alternative items to the user device.

3. The method of claim 2, wherein determining one or more alternative items corresponding to at least one of the word segments based on the access request comprises determining, based on the access request in conjunction with context information of at least one of the word segments, one or more alternative items corresponding to at least one of the word segments.

4. The method of claim 1, wherein determining an input character sequence corresponding to the voice input information based on a voice recognition model comprises determining an input character sequence corresponding to the voice input information based on a voice recognition model in conjunction with context information corresponding to the voice input information.

5. An apparatus comprising:
   a network device for implementing voice input, wherein the network device comprises:
      an input-obtaining module for obtaining voice input information;
      a sequence-determining module for determining voice recognition models in different fields corresponding to the voice input information based on keywords in the context information corresponding to the voice input information, obtaining one or more input syllables corresponding to the voice input information based on the voice recognition models, determining one or more word segments corresponding to the each syllable based on the input syllables, and matching the input syllables in sequence to thereby determine an input character sequence corresponding to the voice input information, wherein, the input character sequence includes multiple word segments corresponding to the voice input information and at least two word segments correspond to a same input syllable and are homophones;
      an accuracy-determining module for determining a conditional probability of the word segments in the input character sequence as appearance probability information of the word segments, and determining accuracy information of the word segments based on an appearance probability threshold value and the appearance probability information of the word segments; and
      a transmitting module for transmitting, to a user device, the input character sequence and the accuracy information of the word segments corresponding to the voice input information,
   wherein the network device further comprises a threshold-value determining module for determining the appearance probability threshold value based on the appearance probability information of the word segments and the appearance probability information of at least one candidate word segment corresponding to the word segments.

6. The apparatus of claim 5, wherein the network device further comprises:
   a request-obtaining module for obtaining an access request for alternative items of at least one of the word segments transmitted by the user device;
   an alternative-determining module for determining one or more alternative items corresponding to at least one of the word segments based on the access request; and
   an alternative transmitting-module for transmitting the one or more alternative items to the user device.

7. The apparatus of claim 6, wherein the alternative determining module is configured for determining, based on the access request in conjunction with context information of at least one of the word segments, one or more alternative items corresponding to at least one of the word segments.

8. The apparatus of claim 5, wherein the sequence-determining module is configured for determining an input character sequence corresponding to the voice input information based on a voice recognition model in conjunction with context information corresponding to the voice input information.

* * * * *